United States Patent
Kackowski

(10) Patent No.: US 6,969,202 B2
(45) Date of Patent: Nov. 29, 2005

(54) UNITIZED BEARING ASSEMBLY

(75) Inventor: Matthew T. Kackowski, Torrington, CT (US)

(73) Assignee: Timken US Corporation, Torrington, CT (US)

( * ) Notice: Subject to any disclaimer, the term of this patent is extended or adjusted under 35 U.S.C. 154(b) by 34 days.

(21) Appl. No.: 10/700,164

(22) Filed: Nov. 3, 2003

(65) Prior Publication Data

US 2005/0094913 A1    May 5, 2005

(51) Int. Cl.$^7$ .............................................. F16C 33/46

(52) U.S. Cl. ..................................................... 384/580

(58) Field of Search ............................... 384/580, 578, 384/577, 575, 572

(56) References Cited

U.S. PATENT DOCUMENTS

| | | |
|---|---|---|
| 5,255,985 A | 10/1993 | Alling |
| 5,391,005 A | 2/1995 | Alling |
| 5,630,670 A | 5/1997 | Griffin et al. |
| 6,767,135 B2 * | 7/2004 | Yokota .......................... 384/580 |

* cited by examiner

Primary Examiner—Lenard A. Footland
(74) Attorney, Agent, or Firm—Michael Best & Friedrich LLP

(57) ABSTRACT

A bearing assembly comprising a cage, a plurality of rollers and a sleeve. The cage comprises a central portion extending between a pair of radial flanges. The central portion includes a plurality of roller retaining pockets configured to receive and prevent substantial radial movement of rollers positioned therein in a radial direction. The sleeve is positioned between the radial flanges with the radial flanges radially overlapping the sleeve. The sleeve is retained between the flanges prevents substantial radial movement of the rollers in the opposite direction.

21 Claims, 2 Drawing Sheets

UNITIZED BEARING ASSEMBLY

BACKGROUND

The present invention relates generally to roller bearings and, more particularly, to a unitized roller bearing assembly.

Referring to FIG. 1, a prior art roller bearing assembly 100 is illustrated. The roller bearing assembly 100 generally includes a plurality of rollers 102 retained within a cage 104. The cage 104 includes a plurality of pockets in which the rollers 102 are positioned and retained. A cup 106 is provided about the outside of the cage 104 and roller 102 assembly to provide an outer bearing surface for the rollers 102. Alternatively, the cup 106 may be provided on the inside of the cage 104 and roller 102 assembly to provide an inside bearing surface. Flanges 108 and 110 extending radially from the cup 106 unitize the assembly and thereby allow the cup 106 to prevent radially outward movement of the rollers 102. Various means have been employed to configure the pockets, for example, tabs extending in to the pockets, to prevent radial movement of the rollers 102 in a direction opposite of the cup 106.

While the cup 106 has provided an adequate means to unitize the assembly, it has some drawbacks. For example, during manufacture, one of the flanges 108 or 110 is generally left uncurled so that the cage 104 and roller 102 assembly may be positioned within the cup 106. Thereafter, a secondary procedure is required to curl the uncurled flange 108 or 110. Additionally, bearing assemblies are often utilized in confined environments, for example, a vehicle transmission, where space is at a premium. The axial thickness of the flanges 108 and 110 must be accommodated by reducing the length of the cage 104 and thereby the rollers 102.

SUMMARY

The present invention provides a bearing assembly comprising a cage, a plurality of rollers and a sleeve. The cage comprises a central portion extending between a pair of radial flanges extending in a first radial direction. The central portion includes a plurality of roller retaining pockets. Each roller retaining pocket is configured to prevent substantial radial movement of a roller positioned therein in a second radial direction opposite the first radial direction. The sleeve is positioned between the radial flanges. The radial flanges extend a distance in the first radial direction such that the flanges radially overlap the sleeve whereby the sleeve is retained between the flanges and the sleeve prevents substantial radial movement of the rollers in the first radial direction.

BRIEF DESCRIPTION OF THE DRAWING FIGURES

DETAILED DESCRIPTION OF THE PREFERRED EMBODIMENTS

Figures 1, 2, 3:
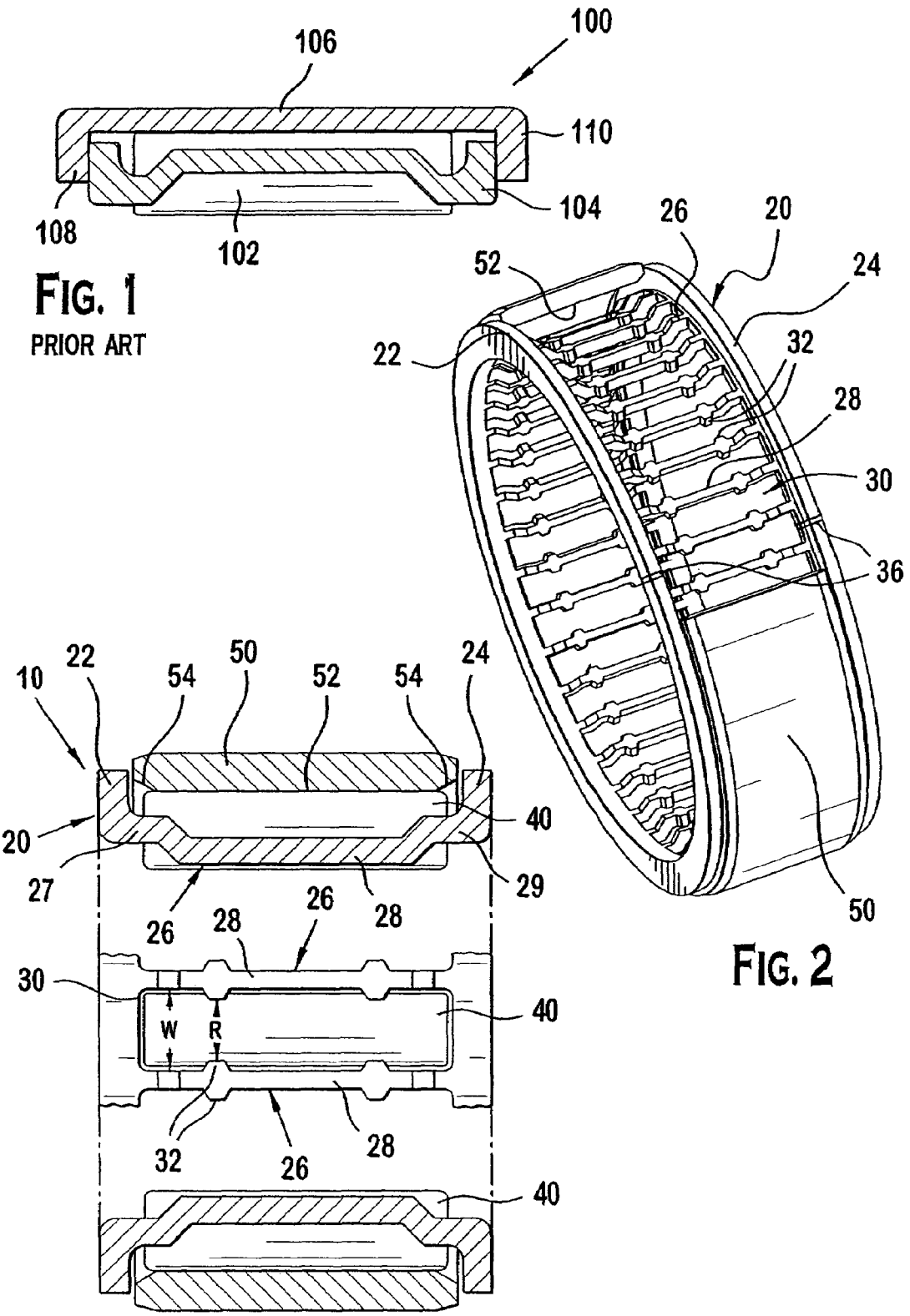
FIG. 1 is a partial view, in cross section, of a bearing assembly of the prior art.
FIG. 2 is an isometric view of a bearing assembly that is a first embodiment of the present invention with the rollers omitted and the sleeve partially omitted.
FIG. 3 is a cross-sectional view of the bearing assembly of FIG. 2 with the rollers in place.

Referring to FIGS. 2 and 3, a bearing assembly 10 that is a first embodiment of the present invention will be described. The bearing assembly 10 generally includes a bearing cage 20, a plurality of rollers 40 and a sleeve 50. The bearing cage 20 of the present embodiment has radial flanges 22 and 24 joined together by crossbars 26. Crossbars 26 have a central portion 28 offset radially inwardly from laterally outward portions 27 and 29. The cage 20 is preferably manufactured from a stamped sheet that is wrapped to form a hoop and then welded, for example, at 36 in FIG. 2. Other manufacturing methods may also be utilized.

Adjacent crossbars 26 are spaced to define a plurality of roller retaining slots 30 about the cage 20. Each slot 30 is sized to retain a roller 40 for rotation therein. In the present embodiment, the radially inward central portions 28 include a plurality of circumferential tabs 32 extending in to the roller retaining slots 30. Opposed tabs 32 define an area having a width R less than the width W of the slot 30 such that the tabs 32 prevent radially inward movement of the rollers 40.

To prevent radially outward movement of the rollers 40, sleeve 50 is positioned about the rollers 40 between the cage flanges 22 and 24. The sleeve 50 is a cylinder having an inside surface 52 having a diameter approximately equal to the outside diameter defined by the rollers 40 such that the inside surface 52 provides an outer bearing surface for the rollers 40. The sleeve 50 may be manufactured from a drawing process, cutting of a cylindrical tube, welding of a wrapped strip, or various other manufacturing techniques. To maintain the sleeve 50 about the rollers 40, each of the cage flanges 22, 24 extends radially outward beyond the outer diameter of the rollers 40. As such, the flanges 22 and 24 radially overlap the sleeve 50 to retain the sleeve 50 and limit axial movement thereof, as shown in FIG. 3. The overlap is such that the flanges 22 and 24 do not extend radially outward past the outer surface of the sleeve 50 such that the flanges 22 and 24 do not interfere with the rotation of the bearing 10.

To facilitate positioning of the sleeve 50 between the flanges 22 and 24, one or both outer edges of the sleeve 50 may include a tapered surface 54 such that the sleeve 50 may be snap fit over one of the flanges 22, 24. The amount of axial retainment of the sleeve 50 required by the flanges 22 and 24 during operation is minimal, and therefore, the amount of radial overlap between the flanges 22 and 24 and the sleeve 50 does not have to be significant, only enough to unitize the assembly 10 under minimal loads encountered during shipping or the like. As such, the sleeve 50 may be snap fit passed one of the flanges 22, 24. Alternatively, the sleeve 50 may be a flat strip that is wrapped around the cage 20 and welded together after it is positioned between the flanges 22 and 24. In yet another alternative, the cage 20 may be positioned within the sleeve 50 prior to welding of the cage 20. That is, the free ends of the wrapped cage 20 may be overlapped such that the cage 20 has a reduced diameter and can be positioned within the sleeve 50. Once positioned within the sleeve 50, with the flanges 22 and 24 about the sleeve 50, the free ends of the cage 20 are abutted, thereby returning the cage 20 to its natural diameter, and the cage 20 is welded. Other means of positioning the sleeve 50 within the flanges 22 and 24 may also be utilized.

The present invention allows a cylindrical sleeve 50 without the need to curl the ends of the outer race, as required in the prior art unitized assembly. Furthermore, the thickness of the curled ends of the prior art assembly is also removed. As such, the cage 20 of the present invention may be made longer (distance from one flange 22 to the other 24), thereby allowing longer rollers 40 resulting in an increased capacity of the bearing assembly 10.

Figure 4:
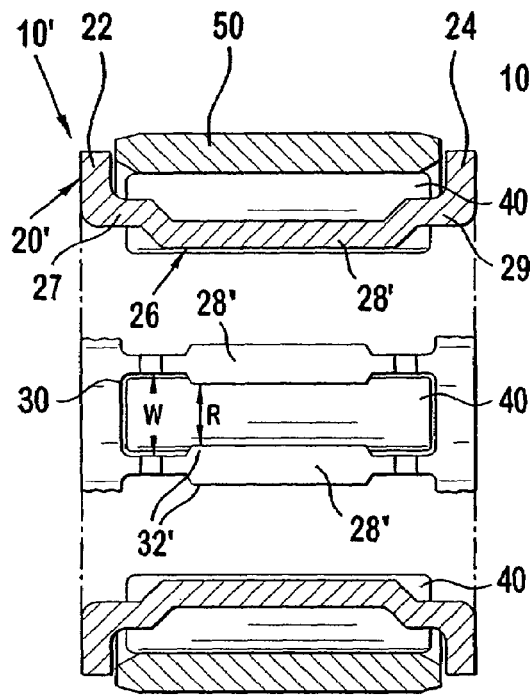
FIG. 4 is a cross-sectional view similar to FIG. 3, illustrating an first alternate embodiment of the present invention.

Referring to FIG. 4, a bearing assembly 10' that is a second embodiment of the present invention is shown. The bearing assembly 10' is substantially the same as in the previous embodiment and includes a cage 20', a plurality of rollers 40 and a sleeve 50, with the rollers 40 and sleeve 50 being substantially identical as to the previous embodiment. The primary distinction versus the previous embodiment is that the central portions 28' of the cage 20' have an expanded width to define the area of reduced width R, as opposed to the tabs of the previous embodiment. As such, the central portions 28' prevent radially inward movement of the rollers 40. The radial flanges 22 and 24 again radially overlap and thereby retain the sleeve 50 which prevents radially outward movement of the rollers 40.

Figure 5:
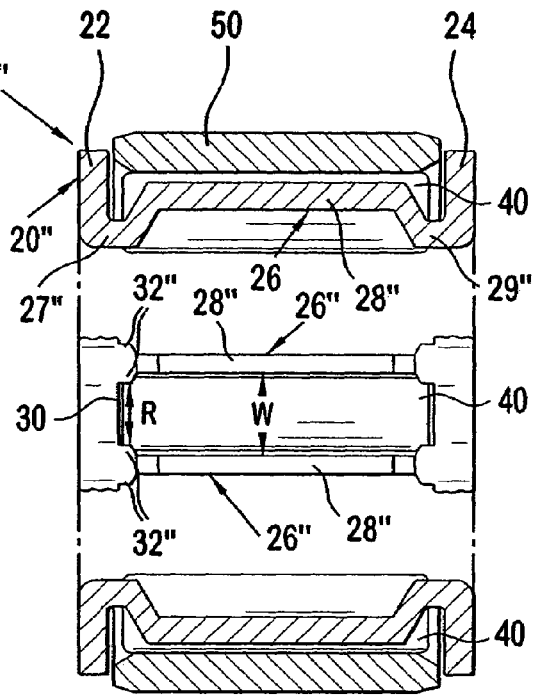
FIG. 5 is a cross-sectional view similar to FIG. 3, illustrating a second alternate embodiment of the present invention.

Referring to FIG. 5, a bearing assembly 10" that is a third embodiment of the present invention is shown. The bearing assembly 10" is substantially the same as in the previous embodiments and includes a cage 20", a plurality of rollers 40 and a sleeve 50, with the rollers 40 and sleeve 50 being substantially identical as to the previous embodiment. In the present invention, the central portions 28" of the cage 20" extend radially outward from the laterally outward portions 27" and 29" that are positioned radially inward. Each laterally outward portion 27" and 29" defines tabs 32" extending into the roller retaining slots 30 to define the area of reduced width R. As such, the tabs 32" of the laterally outward portions 27" and 29" prevent radially inward movement of the rollers 40. The radial flanges 22 and 24 again radially overlap and thereby retain the sleeve 50 which prevents radially outward movement of the rollers 40. The central portions 28" may also be provided with radially outward retaining means, but such is not required as the sleeve 50 prevents radially outward movement.

These various embodiments illustrate that various means may be provided opposite the sleeve 50 to prevent radial movement of the rollers 40 in a direction opposite the sleeve 50. The various means are not limited to the illustrated embodiments, but may include other configurations.

Figure 6:
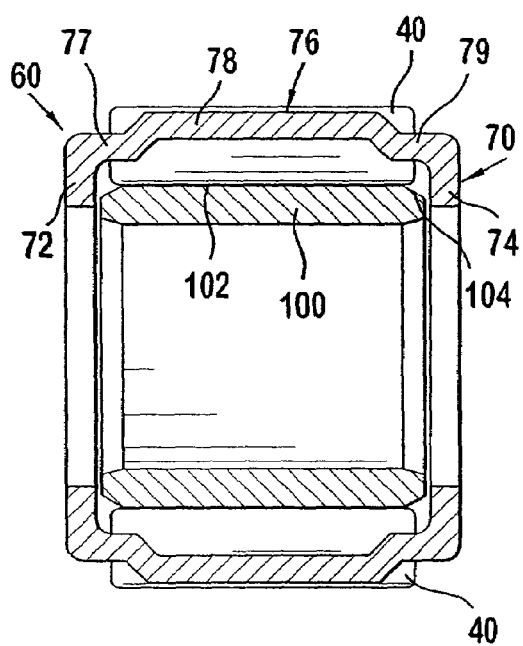
FIG. 6 is a cross-sectional view similar to FIG. 3, illustrating a third alternate embodiment of the present invention.

Referring to FIG. 6, a bearing assembly 60 that is a fourth embodiment of the present invention is shown. The bearing assembly 60 is an inverted version of the bearing assembly 10 of the first embodiment. That is, the sleeve 100 is positioned within the rollers 40 and has an outside surface 102 that serves as an inside bearing surface for the rollers 40 and prevents radially inward movement of the rollers 40. The cage 70 includes a plurality of crossbars 76 extending between radial flanges 72 and 74. In the present embodiment, the flanges 72 and 74 extend radially inward such that the flanges 72 and 74 radially overlap the sleeve 100. Each crossbar 76 includes a radially outward central portion 78 extending between laterally outward portions 77 and 79. Similar to the first two embodiments, the central portions 78 include tabs, an increased thickness, or other means (not shown) to prevent radial outward movement of the rollers 40. The bearing assembly 60 may be manufactured in various manners, including those described with reference to the earlier embodiments. For example, the sleeve 100 may include tapered edges 104 to facilitate snap fitting of the sleeve within the flanges 72 and 74. Alternatively, the cage 70 may be wrapped about the sleeve 100 and thereafter welded. Other methods may also be utilized.

Figure 7:
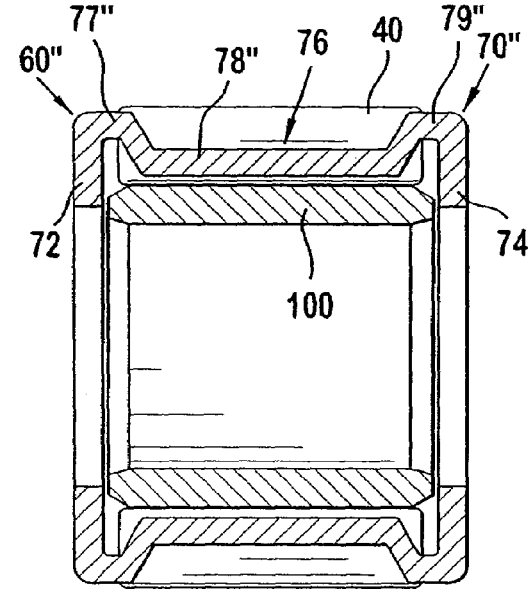
FIG. 7 is a cross-sectional view similar to FIG. 3, illustrating a fourth alternate embodiment of the present invention.

Referring to FIG. 7, a bearing assembly 60" that is a fifth embodiment of the present invention is shown. The bearing assembly 60" is an inverted version of the bearing assembly 10" of the third embodiment. As in the previous embodiment, the sleeve 100 is positioned within the rollers 40 and has an outside surface 102 that serves as an inside bearing surface for the rollers 40 and prevents radially inward movement of the rollers 40. The cage 70" includes a plurality of crossbars 76 extending between radial flanges 72 and 74 with the flanges 72 and 74 extending radially inward such that the flanges 72 and 74 radially overlap the sleeve 100. Each crossbar 76 includes radially outward laterally outward portions 77" and 79", with the central portion 78" being radially inward therefrom. Similar to the third embodiment, the laterally outward portions 77" and 79" include tabs, an increased thickness, or other means (not shown) to prevent radial outward movement of the rollers 40.

What is claimed is:

1. A bearing assembly comprising:
   a cage comprising a pocket portion extending between a pair of radial flanges extending in a first radial direction, the pocket portion including a plurality of roller retaining pockets, each roller retaining pocket configured to prevent substantial radial movement of a roller positioned therein in a second radial direction opposite the first radial direction;
   a plurality of rollers positioned in respective roller retaining pockets;
   a sleeve positioned between the radial flanges, the radial flanges extending a distance in the first radial direction such that the flanges radially overlap the sleeve whereby the sleeve is retained between the flanges and the sleeve prevents substantial radial movement of the rollers in the first radial direction.

2. The bearing assembly of claim 1 wherein each pocket has a general width W slightly greater than a diameter of a respective roller and at least one area of reduced diameter R less than the width W.

3. The bearing assembly of claim 2 wherein the pocket portion is defined by a plurality of spaced apart crossbars, each crossbar including a central portion extending between a pair of laterally outward portions with the central portion radially offset from the laterally outward portions.

4. The bearing assembly of claim 3 wherein the central portions are offset in the second radial direction relative to the outward portions and the central portions have at least one area of increased circumferential width to define the at least one area of reduced diameter R.

5. The bearing assembly of claim 4 wherein the first radial direction is radially outward and the second radial direction is radially inward.

6. The bearing assembly of claim 4 wherein the first radial direction is radially inward and the second radial direction is radially outward.

7. The bearing assembly of claim 3 wherein the central portions are offset in the first radial direction relative to the outward portions and the outward portions have at least one area of increased circumferential width to define the at least one area of reduced diameter R.

8. The bearing assembly of claim 7 wherein the first radial direction is radially outward and the second radial direction is radially inward.

9. The bearing assembly of claim 7 wherein the first radial direction is radially inward and the second radial direction is radially outward.

10. The bearing assembly of claim 1 wherein the bearing assembly has a central axis and the sleeve has an inner radius and an outer radius relative to the central axis and each flange terminates at an end surface that is at a radius relative to the central axis between the sleeve inner and outer radii.

11. The bearing assembly of claim 1 wherein the sleeve has at least one tapered lateral edge.

12. The bearing assembly of claim 1 wherein the first radial direction is radially outward and the second radial direction is radially inward.

13. The bearing assembly of claim 12 wherein the rollers define an outer diameter and the sleeve has an inner diameter substantially equal to the outer diameter defined by the rollers such that the sleeve provides an outer bearing surface for the rollers.

14. The bearing assembly of claim 13 wherein each flange terminates at an end surface and each flange end surface has a diameter greater than the sleeve inner diameter.

15. The bearing assembly of claim 14 wherein the sleeve has an outer diameter greater than each flange end surface diameter.

16. The bearing assembly of claim 12 wherein the sleeve is tapered on an inner surface along at least one lateral edge thereof.

17. The bearing assembly of claim 1 wherein the first radial direction is radially inward and the second radial direction is radially outward.

18. The bearing assembly of claim 17 wherein the rollers define an inner diameter and the sleeve has an outer diameter substantially equal to the inner diameter defined by the rollers such that the sleeve provides an inner bearing surface for the rollers.

19. The bearing assembly of claim 18 wherein each flange terminates at an end surface and each flange end surface has a diameter less than the sleeve outer diameter.

20. The bearing assembly of claim 19 wherein the sleeve has an inner diameter less than each flange end surface diameter.

21. The bearing assembly of claim 17 wherein the sleeve is tapered on an outer surface along at least one lateral edge thereof.

* * * * *